United States Patent [19]

Simokat

[11] Patent Number: 4,757,407
[45] Date of Patent: Jul. 12, 1988

[54] PROTECTIVE TAB FOR FLOPPY DISKS

[76] Inventor: Charles J. Simokat, 129 Overstreet Ct., Palm Harbor, Fla. 33563

[21] Appl. No.: 34,692

[22] Filed: Apr. 6, 1987

[51] Int. Cl.⁴ .............................................. G11B 19/04
[52] U.S. Cl. ........................................ 360/60; 360/133
[58] Field of Search .................... 360/60, 133; 369/289

[56] References Cited

U.S. PATENT DOCUMENTS 4,649,452 3/1987 Brugman ............................ 360/133

Primary Examiner—A. J. Heinz
Attorney, Agent, or Firm—Glenn K. Robbins

[57] ABSTRACT

A protective tab for floppy disks having an opening that is designed to be covered to prevent accidental erasure of any recording thereon. The protective tab has an integral clamshell construction such that it can be pried opened to be positioned over the floppy disk jacket opening and snapped closed to engage the border of the floppy disk jacket and cover the opening. A characterized opening having a narrow throat is punched out over the regular opening in the floppy disk jacket. This opening can either be manufactured into the floppy disk jacket, or retrofitted into a pre-existing conventional disk jacket by use of a special punch which is provided for cutting out the characterized opening. The protective tab has a mating characterized pad on the inside of one of the clamshell halves which is inserted in the disk opening. When closed the protective tab can not be accidentally pulled out unless purposely opened.

9 Claims, 3 Drawing Sheets

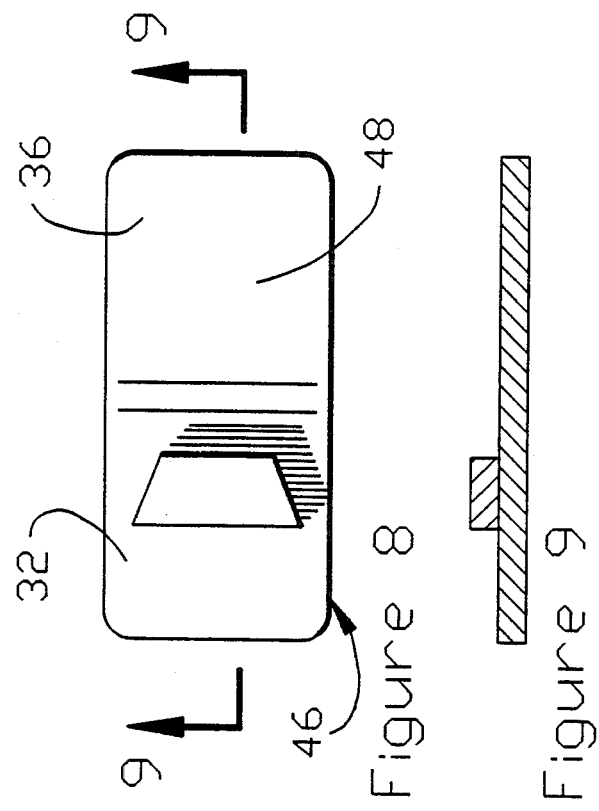
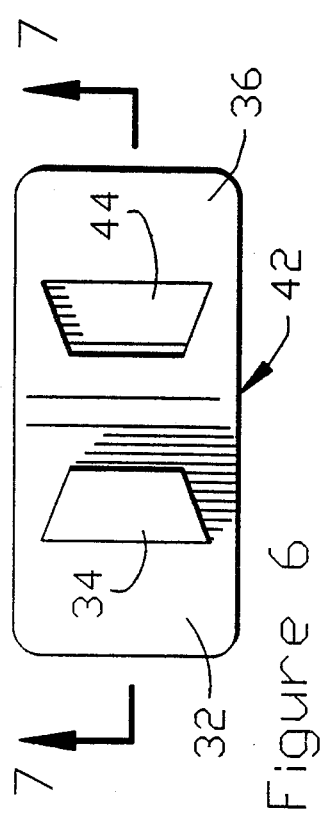
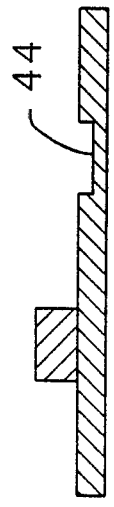
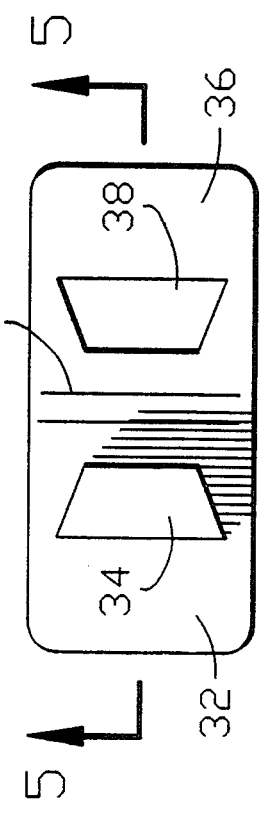

PROTECTIVE TAB FOR FLOPPY DISKS

BACKGROUND OF THE INVENTION

In general use, various computers such as the desk top personal computers have one or two floppy disk drives. These serve as magnetic media storage devices. The data is stored on what is commonly called floppy disk.

These floppy disks have a write protect feature in order to prevent inadvertent writing over a disk that is meant to be preserved and have read only data.

Conventionally a relatively simple process is employed to make a disk read only as opposed to being both read and write. The disks jackets are notched on one edge with a rectangular notch. A disk jacket with this notch left uncovered is able to both have data read from it and written on it. Covering the notch with a piece of pressure sensitive adhesive tape protects the disk to render it to the read only mode.

The use of the tape, while a simple expedient has led to various problems one, of which is the adhesive on the tape that leaves a residue which can destroy the disk or damage the disk drives. The tape through use may become tattered and require replacement. The tape may get caught in the disk drive and dislodge in the mechanism and cause expensive drive repair. The removal of the tape is somewhat cumbersome as is the emplacement of the new tape. Excessive handling can not only entail lost time, but can damage the disk, the disk drive device or both.

SUMMARY OF THE INVENTION

By means of this invention there has been devised a simple protective integral hinge tab which can be employed to replace the conventional pressure sensitive adhesive tape. Further, the tab may be repeatedly reused on the same or other floppy disks as well.

The tab may be made of plastic or the like and has two halves integrally hinged and biased together. The construction is much like a clamshell in that the two halves may be spread apart and fitted over the notch on the edge of the floppy disk jacket. When the halves are released, the tab snaps shut to tightly engage the edge of the disk jacket and cover the notch in a protective relation.

A special feature of the invention resides in reshaping the rectangular notch in the edge of the floppy disk jacket into a socalled characterized opening such as an inverted wedge or trapezoid or the like. An inner face of one of the tab halves is formed with an upraised pad or core portion having the same inverted wedge or trapezoid configuration as the aforementioned reshaped opening on the edge of the disk jacket. When the tab is spread apart and literally snapped over the edge of the disk jacket the mating interfit of the pad inserted in the opening ensures that the tab can not accidentally slide or work its way off the floppy disk jacket inadvertently. The inverted wedge or trapezoid opening has a narrow throat portion on the edge ensuring that when the pad of the tab is inserted a locking relation against a sliding movement is provided.

In order to ensure locking of the protective tab, a mating opening or pocket may be provided on the inside of the other half of the tab. Other types or configurations of the opening may be provided as long as there is a narrow restrictive throat which prevents the pad of the tab being moved toward the edge of the disk jacket.

The above features are objects of this invention. Further objects will appear in the detailed description which follows and will be further apparent to those skilled in the art.

For the purpose of illustration of this invention, a preferred embodiment thereof is shown in the accompanying drawing. It is to be understood that the drawing is for purpose of description only and that the invention is not limited thereto.

IN THE DRAWING

FIG. 4 is an enlarged plan view of the protective tab bent to an extended position;

FIG. 5 is a view in section taken on the line 5—5 of FIG. 4;

FIG. 6 is an enlarged plan view of a modified form of the protective tab bent to an extended position;

FIG. 7 is an enlarged view in section taken on the line 7—7 of FIG. 6;

FIG. 8 is an enlarged plan view of a further modified form of the protective tab bent to an extended position;

FIG. 9 is a view in section taken on the line 9—9 of FIG. 8;

DESCRIPTION OF THE INVENTION

Figure 1:
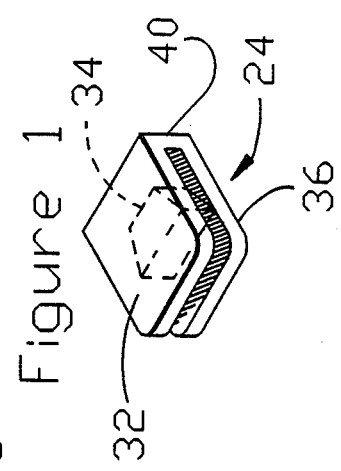
FIG. 1 is an enlarged pictorial view of the protective tab of this invention.
Figure 3:
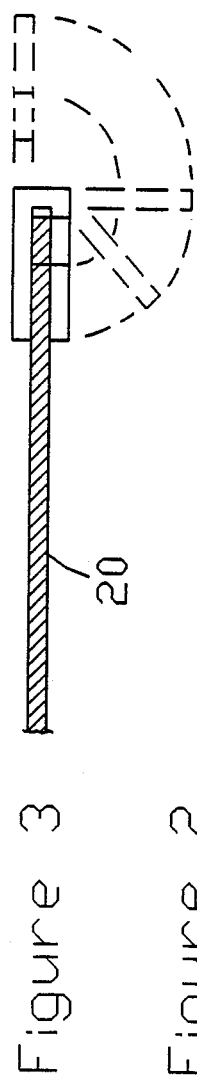
FIG. 3 is an enlarged view in section taken on line 3—3 of FIG. 2 showing the tab in different positions in use.
Figure 2:
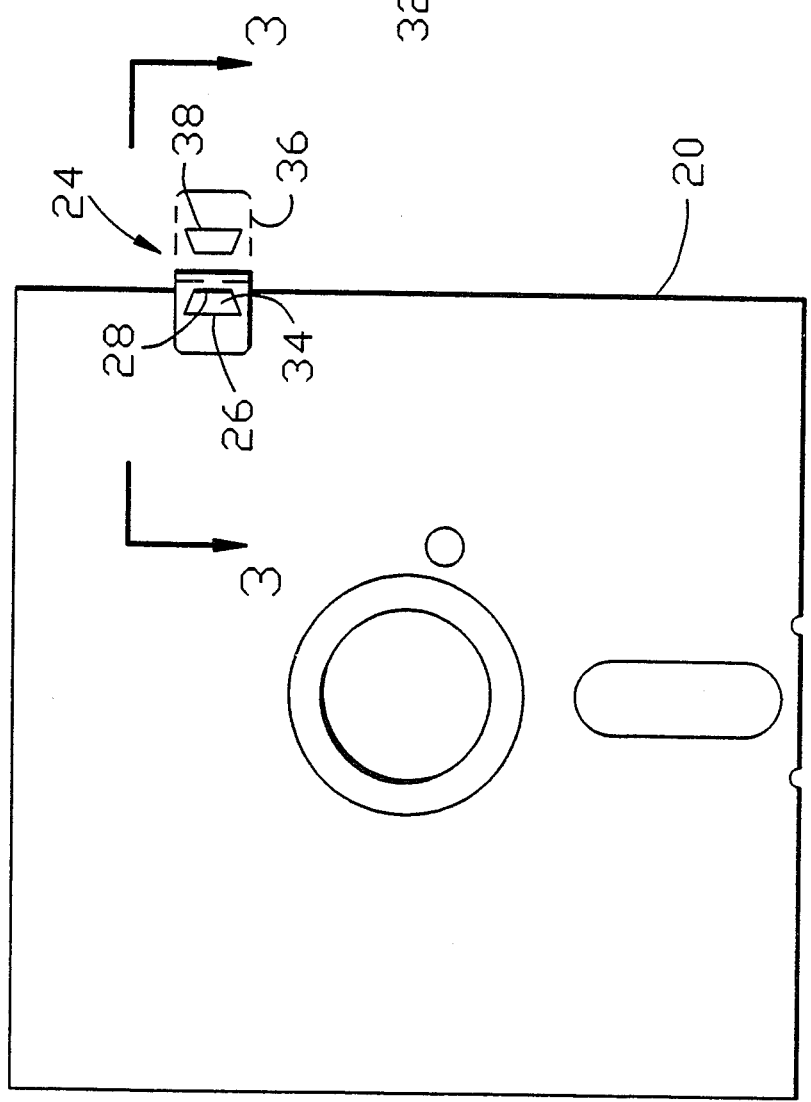
FIG. 2 is a plan view of a smaller scale than FIG. 1 of a floppy disk jacket having the cut out characterized opening with the protective tab bent to an interfitting position.
Figure 12:
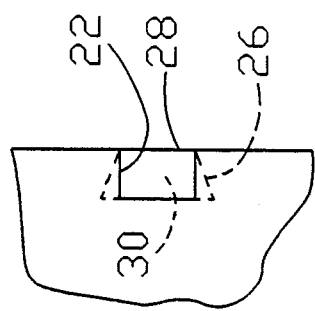
FIG. 12 is a fragmentary plan view of a portion of a floppy disk jacket having a conventional rectangular notch showing in dotted lines the reshaped characterized opening.
Figure 10:
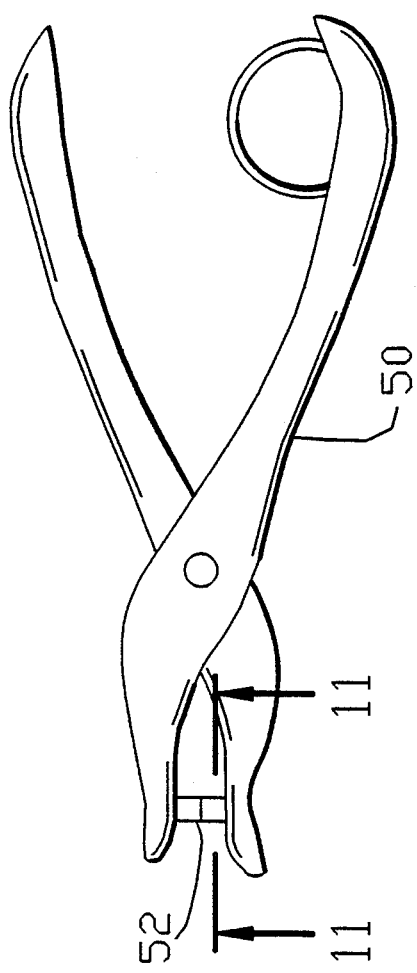
FIG. 10 is a plan view of a punch employed to cut out the mating characterized opening in the floppy disk jacket.

The floppy disk jacket with the characterized opening of this invention is generally indicated by the reference numeral 20 in FIGS. 2 and 3. It is understood that the jacket contains a floppy disk (not shown) as is conventional in this art. The conventional rectangular or square notch to provide read or read and write modes is shown in the fragmentary view of FIG. 11 and is indicated by the reference numeral 22. The protective tab of this invention which is employed to cover the opening 22 after it has been altered to a characterized configuration is designated by the reference numeral 24 and is well shown in FIGS. 1 through 3.

Figure 11:
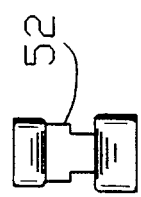
FIG. 11 is a view in section taken on the line 11—11 of FIG. 10.

In the practice of the invention the conventional rectangular opening is reshaped to the characterized opening 26 shown in FIG. 2 and by dotted lines in FIG. 11. This shape provides a restricted throat 28 at the edge of the disk jacket and an enlarged opening 30 behind the throat. Although shown in the form of an inverted wedge other forms such as a notch in one or both the sides of the rectangular opening may be employed to prevent the protective tab 14 from sliding out of engagement with the border of the floppy disk jacket as will be more fully explained hereinbelow.

The protective tab 24 is of an integrally hinged clashell construction adapted to be opened and clamped to the edge of the floppy disk jacket to cover the characterized opening 26. One half 32 as shown in FIGS. 2, 3, 4 and 5 has an elevated insert pad or protruberance 34 having a mating configuration to the characterized opening 26 but slightly smaller so as to easily fit therein. The opposite half 36 of the tab has a cut out opening 38 of substantially the same size and shape as the characterized opening in order that the insert pad when fitted over the floppy disk jacket can fit through the characterized opening 26 and the cut out opening 38 in locking relation. In FIGS. 2, 3, 4 and 5 the protective tab is shown opened and bent to 180° for simplicity in showing its construction.

The tab 24 is conveniently made of plastic. The two halves 32 and 36 are connected by a hinge portion 40 and are biased toward each other to close tightly together in their normal position. When the tab is opened and fitted onto the floppy disk jacket the tab and disk jacket are clamped together and the tab can not be removed until purposely opened.

A modification of the tab 24 shown in FIGS. 2, 3, 4 and 5 is designated by reference numeral 42 in FIGS. 6 and 7 where the same reference numerals are employed for similar parts. In this embodiment the pad 34 in the top half 32 is adapted when closed together to nest in a recess 44 in the opposite half 36. The recess 44 has the same configuration as the aforementioned opening and provides a modified and protected locking engagement for the characterized opening 26 of the floppy disk jacket. In the modification, the insert pad is not exposed when the tab is secured.

A further simplified modification is shown in FIGS. 8 and 9 and designated by the reference numeral 46. In this embodiment, the top half 36 has a flat surface 48 on its inside. The insert pad is engaged only in the characterized opening.

It will be understood that the pad and recess may also be stamped upon the tab halves. Also the characterized opening 26 may be incorporated in the original disk jacket or altered by reshaping the rectangular slot 22 as aforementioned.

Where reshaping of the rectangular opening 22 is contemplated a punch tool 50 having a punch 52 may be conveniently employed. The punch 52 has the same shape as the characterized opening 26 to be cut out in the floppy disk jacket. The cutting die in the tool also employs a guide in the shape of the conventional rectangular opening to ensure accurate placement of the cutting tool. This tool provides a simple and convenient method for reshaping the conventional rectangular opening in the floppy disk jacket.

USE

The protective tab 24 is very simply employed on a floppy disk jacket 20 provided with the characterized opening 26. The floppy disk jacket may have such opening incorporated in the original manufacture. If not so supplied and the disk jacket has the conventional opening 22, the punch tool may be employed to reshape the opening.

With the disk jacket provided with the proper characterized opening 26 the protective tab may be simply emplaced over the opening to change the read or write mode to read only. This is simply accomplished by spreading apart the opposed halves 32 and 36 to a substantially 90° angle as shown in FIG. 3 and inserting the insert pad 34 of the half 32 into the characterized opening. The protective tab is closed by the natural springlike biasing action to engage the opposite faces of the floppy disk jacket in locking engagement. The nesting of the insert pad 34 in the opening 44 of the opposite tab half 36 further ensures the secure locking.

When removal of the tab 24 is desired, the reverse operation is effected. The halves are simply spread apart by grasping the free edges and removed. The modified protective tabs 42 and 46 are employed in a similar manner.

Various changes and modifications may be made within this invention as will be apparent to this skilled in the art. Such changes and modifications are within the scope and teaching of this invention as defined in the claims appended hereto.

What is claimed is:

1. A protective tab for floppy disk jackets having a notch at a side edge which when open provides a read or write mode and when covered provides a read only mode, said tab being comprised of hinged half members biased together and adapted to be fitted over said notch in covering relation thereto and clamping the side of the floppy disk jacket between said half members and means for securing said protective tab against relative sliding movement on said floppy disk jacket, said means comprising an insert element connected to an inner-face of only one of the half members and being closely engageable in said notch, both said insert element and said notch having a characterized configuration preventing sliding movement toward the side edge of the jacket having said notch, said characterized configuration extending beyond at least one side of a standard rectangular notch provided for said jacket.

2. The protective tab of claim 1 in which the characterized configuration in the floppy disk jacket has a restricted throat portion preventing sliding movement of the insert element toward the edge of the floppy disk jacket.

3. The protective tab of claim 1 in which the protective tab is integral and is made of plastic and can be opened sufficiently about a hinge connecting the two half members at side edges to be opened and closed repeatedly about the side edge of a floppy disk jacket.

4. A protective tab for floppy disk jackets having a notch at a side edge which when open provides a read or write mode and when covered provides a read only mode, said tab being comprised of hinged half members biased together and adapted to be fitted over said notch in covering relation thereto and clamping the side of floppy disk jacket between said half members and means for securing said protective tab against relative sliding movement on said floppy disk jacket, said means comprising an insert element supported on an inner-face of one of the half members and being closely engageable in said notch, both said insert element and said notch having a characterized configuration preventing sliding movement, said characterized configuration being a characterized opening in the form of a wedge-like inverted trapezoid.

5. A protective tab for floppy disk jackets having a notch at a side edge which when open provides a read or write mode and when covered provides a read only mode, said tab being comprised of hinged half members biased together and adapted to be fitted over said notch in covering relation thereto and clamping the side of the floppy disk jacket between said half members and means for securing said protective tab against relative sliding movement on said floppy disk jacket, said means comprising an insert element supported on an inner-face of one of the half members and being closely engageable in said notch, both said insert element and said notch having a characterized configuration preventing sliding movement, said insert element being engageable with a mating opening in the opposite half member when the tab is clamped over the characterized notch in the floppy disk jacket.

6. A protective tab for floppy disk jackets having a notch at a side edge which when open provides a read or write mode and when covered provides a read only mode, said tab being comprised of hinged half members biased together and adapted to be fitted over said notch in covering relation thereto and clamping the side of the floppy disk jacket between said half members and means for securing said protective tab against relative siding movement on said floppy disk jacket, said means comprising an insert element supported on an inner-face of one of the half members and being closely engageable in said notch, both said insert element and said notch having a characterized configuration preventing sliding movement, said insert element being engageable with a mating recess in the opposite half member when the tab is clamped over the characterized opening in the floppy disk jacket.

7. A method for covering a rectangular notch at a side edge of a floppy disk jacket with a removable protective tab to provde a read only mode when covered by the protective tab to a read or write mode when uncovered, said method comprising reshaping the rectangular notch in the floppy disk jacket to a characterized opening extending beyond said rectangular notch and clamping a hinged tab over said opening, said protective tab comprising hinged half members biased together and having an insert element connected to only of said half members and shaped to fit closely within said characterized opening, fitting said half members with said insert over said characterized opening and inserting said insert element in said characterized opening of the floppy disk jacket to prevent said protective tab sliding off the side edge of the floppy disk jacket.

8. The method of claim 7 in which the protective tab is clamped to the floppy disk jacket by opening the half members and positioning the opened tab over the floppy disk jacket with said disk between the opened half members, registering the insert element with the characterized opening and releasing the half members to provide a biased clamping relation of the tab over the disk jacket.

9. A method for covering a rectangular notch at a side edge of a floppy disk jacket with a removable protective tab to provide a read only mode when covered by the protective tab to a read or write mode when uncovered, said method comprising reshaping the rectangular notch in the floppy disk jacket to a characterized opening and clamping a hinged tab over said opening, said protective tab comprising hinged half members biased together and adapted to be fitted over said characterized opening and said tab having an insert element closely engageable in said characterized opening of the floppy disk jacket to prevent said protective tab sliding off the side edge of the floppy disk jacket, the rectangular notch being reshaped to the form of the characterized opening by a punch having a guide mating with the rectangular notch and a die conforming to the characterized opening to be punched.

* * * * *